April 14, 1953     D. J. WEIRICH     2,634,791
CHILD'S CONVERTIBLE VEHICLE
Filed Aug. 14, 1950     2 SHEETS—SHEET 1
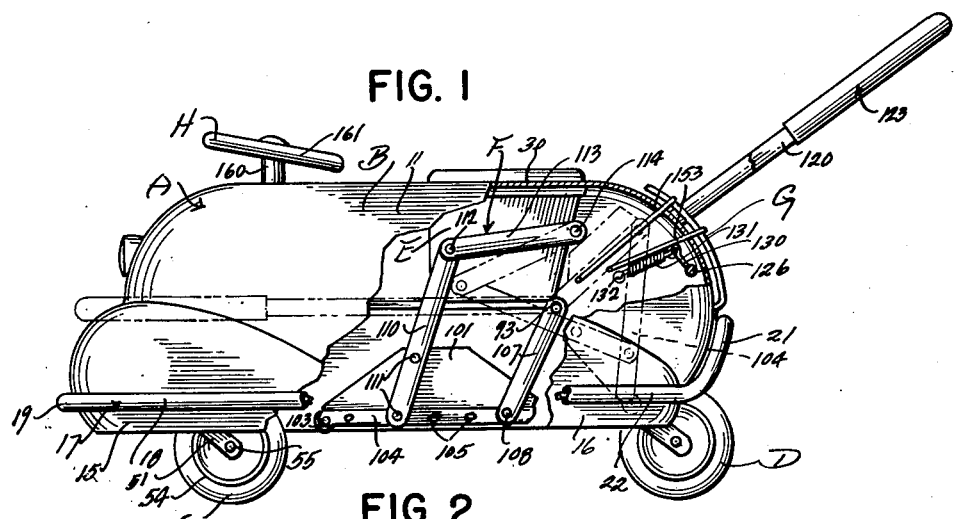
INVENTOR.
DAVID J. WEIRICH
BY
ATTORNEYS.

April 14, 1953    D. J. WEIRICH    2,634,791
CHILD'S CONVERTIBLE VEHICLE
Filed Aug. 14, 1950    2 SHEETS—SHEET 2

INVENTOR.
DAVID J. WEIRICH
BY Lancaster, Allwine & Rommel
ATTORNEYS.

Patented Apr. 14, 1953

2,634,791

UNITED STATES PATENT OFFICE 2,634,791

CHILD'S CONVERTIBLE VEHICLE

David J. Weirich, Williamstown, N. J.

Application August 14, 1950, Serial No. 179,175

9 Claims. (Cl. 155—22)

This invention relates to improvements in vehicles for children.

The primary object of this invention is the provision of a combination child's vehicle which can be converted from a baby walker to a carriage through manipulation of a handle mechanism without the necessity of detaching any of its parts.

A further object of this invention is the provision of a convertible child's vehicle which can serve as a carriage or a baby walker; the same having an improved foot rest construction which can be operated to convert the vehicle from a baby walker to a carriage or vice versa with ease and complete safety to the child using the vehicle.

Other objects and advantages of the invention will be apparent from the following detailed description.

In the accompanying drawings, forming a part of this specification and wherein similar reference characters designate corresponding parts throughout the several views.

Figure 1 is a side elevation, partly in section, showing an improved foot rest in position so that the vehicle can conventionally serve as a carriage.

Figure 2 is a fragmentary plan view of the vehicle in condition to serve as a carriage.

Figure 3 is a fragmentary view, partly in section, showing an improved type of front running gear for the support of the vehicle.

Figure 4 is a view of the details shown in Fig. 3, taken at 90° with respect thereto.

Figure 5 is a cross sectional view taken substantially on the line 5—5 of Figure 2, through the foot rest structure.

Figure 6:
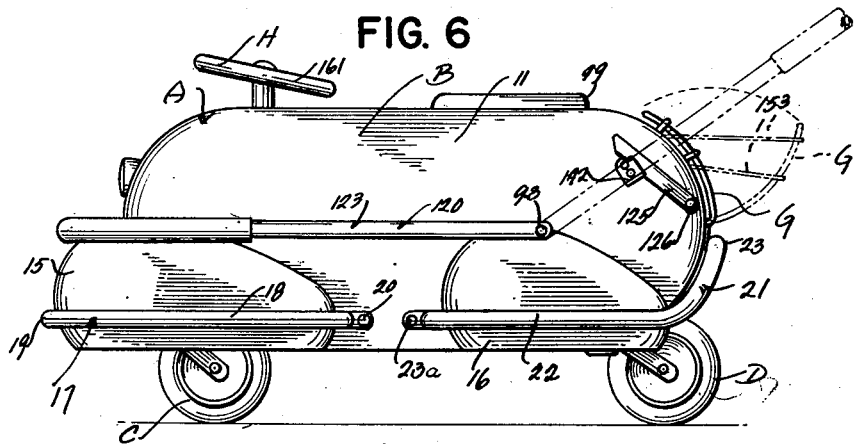
Figure 6 is a side elevation of the vehicle with the parts in position to serve as a baby walker.

In the drawings, wherein for the purpose of illustration is shown only a preferred embodiment of the invention, the letter A may generally designate the vehicle. It includes chassis frame structure B having front running gear C; rear running gear D; a seat structure E, and a foot rest structure and its operating mechanism F. As part of the vehicle there may be provided an article carrying rack structure G and a dummy steering gear H.

The chassis frame structure B can vary to suit. In the present instance it has been shaped to simulate that of a passenger automobile. It preferably includes side walls 10 and 11, a front wall 12 and a rear wall structure 13. The front and rear walls 12 and 13 may be suitably curved to present a streamlined appearance and the side walls 10 and 11 are preferably provided with front and rear fenders 15 and 16, which may be struck from the material in event the body structure is formed of sheet metal, or the fenders may be of separate material, if desired. Inasmuch as such vehicles receive rough usage, it is intended to provide guard rails, including a front guard rail structure 17 of U-shaped formation. It consists of side portions 18 and a front portion 19; the rear ends and the side portions 18 being connected at 20 to the side walls of the chassis frame structure. The rear guard frame 21 includes the side portions 22 curving upward at their rear ends and connected to a rear cross piece 23. The front ends of the side pieces 22 are connected at 23ª to the side walls of the chassis frame. The side portions and front and rear cross pieces of the guard rails project beyond the outer confines of the chassis frame structure to guard against injury to the body of the frame structure. A top wall structure 30 may be provided, continuous with the side, front and rear walls of the chassis frame, having a child's entrance opening 31 therethrough (see Figure 7).

Referring to the front running gear structure C, the walls 10 and 11 are provided at the front and inside surfaces thereof with L-shaped brackets 40, shown in Figures 2, 3, 4 and 7 of the drawings. These brackets each include an attaching leg 41 riveted at 42 to the inner surface of the side wall, and a right angled caster wheel supporting flange 43 provided with a pintle receiving barrel 44 thereupon. The latter has a passageway therethrough shown at 45, vertically disposed and adapted to rotatably receive the pintle or shaft 46 of the wheel structure.

The two brackets 40 are connected by means of a cross brace 47, shown in Figure 2, the ends of which are riveted or bolted as at 48 to the bracket structures 40, as shown in Figure 4.

Each of the front caster wheels includes an inverted U-shaped frame 50 to which the pintle 46 is welded or otherwise fixedly connected. The frame 50 extends in line at an acute angle with respect to the axis of the pintle 46, extended, as shown in Figure 3, and the lower ends of the leg portions of the frame 50 have pivoted thereto a transverse U-shaped frame 51. The latter includes leg portions 52 and 53, the free ends of which rotatably support a rubber tired wheel 54 upon a bearing pin 55. The legs 52 and 53 adjacent to the bight portion 56 thereof are pivoted at 57 to the lower ends of the legs of the frame 50. A spring 60 is connected at one end to the bight 56 and at its opposite end to the upper end of the frame 50, at 61. The spring 60 is under tension and normally urges the wheel 54 downwardly. A cross stop pin 62 is carried upon the lower ends of the frame 50 below the pivot pin 57 and the legs of the wheel supporting frame 51 engage this stop pin 62 in order to limit the down position of the wheels 54 to what is shown in Figure 3. From this position the wheels may ride upwardly into the chamber of the chassis frame to the dot and dash position shown in Figure 3. This, of course, is under influence of the weight of the child, and the spring 60 extends itself to permit this up and down motion and shock absorbing feature. The wheel pivot 55 is offset from the axis of the pintle 46 to give the wheels a caster effect. They rotate through 360° upon the axis of the pintle 46. Sufficient room is given for this swing, as will be noted from the outstruck fender portion 15 shown in Figure 4.

Referring to the rear running gear D, the same includes two identical wheel structures 70. Each has U-shaped brackets 71, one leg 72 of which is riveted at 73 to the side wall of the chassis frame structure, and the other leg 74 being spaced therefrom and connected therewith by means of a bight 75. The lower ends of the legs 72 and 73 support a U-shaped wheel carrying frame 76 upon a pivot pin 77 much in the same manner as above described for the front caster wheel structures. The U-shaped frame 76 at the lower ends of the legs thereof vertically support a rubber tired wheel 79 upon a pin 78. The legs of the frame 76 are connected by a bight portion 80 to which a spring 81 is connected. The spring 81 is under tension and connected at its other end to the bight portion 75. The effect is to urge the wheel 79 downwardly. The down position is limited by a cross stop pin 82 of the same nature and position as the stop pin 62 of the front caster wheel structure above described.

Figures 8, 9:
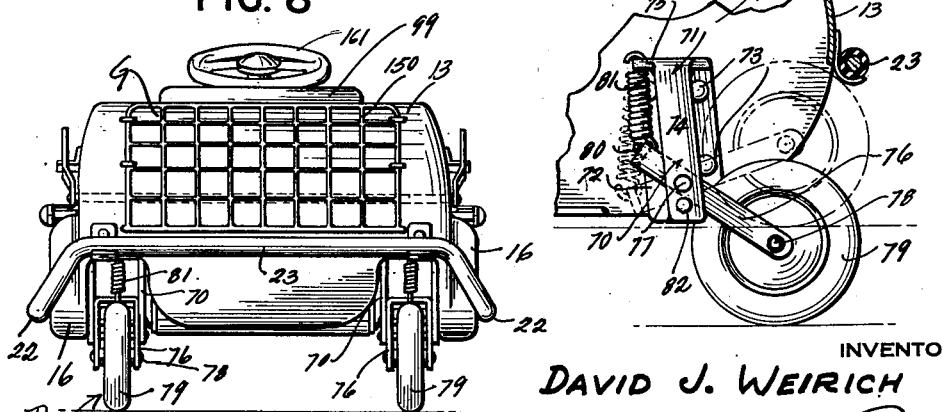
Figure 8 is a rear view of the vehicle.
Figure 9 is a fragmentary view, partly in section, showing rear running gear used upon the vehicle.

It will be noted that the rear wheels are not of the caster type, but they move up and down between the positions shown in Figure 9.

Referring to the seat structure E, the same includes a seat body 90 having a forwardly extending straddling portion 91, the fore end of which is connected as shown at 92 to the cross brace 47 (see Figure 2). The rear end of the seat body 90 may rest upon a rotatable cross shaft 93. The latter functions as part of the control mechanism for the foot rest, as will be described hereinafter. The body portion 90 of the seat has side walls 95 and 96 and a rear wall 97, preferably of sheet metal. They extend upwardly through the opening 31 and outline the chamber within which the child sits. The upper ends of these walls are flanged over the top wall 30 of the chassis frame structure and secured thereto, as shown at 99 in Figure 7 of the drawings.

Referring to the foot rest structure F, the same includes a foot rest portion having a floor portion 100 with upwardly extending side walls 101 and an upwardly extending rear flange 102 (see Figure 5). The front end thereof is provided with a friction bar 103, preferably non-rotatable and secured to reinforcing side bars 104. The latter are riveted as at 105 along the lower margins of the walls 101 at the outer sides thereof.

The rotatable cross bar 93 above described is provided with right angled supporting arms 107, the opposite ends of which are pivoted as at 108 to the rear ends of the foot rest bars 104, at each side of the structure.

At each side of the foot rest structure there are provided arm portions 110 riveted as at 111 to the walls 101 and to the cross bars 104, as shown in the drawings. These arms 110 extend upwardly and to the rear when the floor 100 is horizontally positioned with the vehicle converted to carriage use, and the upper ends thereof are pivoted as at 112 to the ends of link arms 113. The latter at their opposite ends are fixedly connected upon a rotatable shaft 114. The ends of the latter bear in the side walls 10 and 11 of the chassis frame structure.

The shaft 93 at its ends extends through the side walls of the chassis frame structure, as is shown in Figure 2, and at the outer sides of the vehicle, have affixedly connected therewith the portions 120 and 121 of a U-shaped handle 123. The cross bar 124 is the hand engaging part of the handle. The U-shaped handle 123 is of such nature that when the foot rest 100 is in horizontal position to support the child's feet, it will be positioned as shown in Figure 1 extending rearwardly and upwardly at an angle for convenient grasp by the individual who is pushing the carriage. While in this position the handle is held against displacement by means of detents 125, fixed upon a shaft 126 which extends transversely across the vehicle. This shaft 126 is pivoted and inside of the vehicle it is provided with a rigidly connected arm 130, shown in Figure 7, having a spring 131 connected therewith. The spring 131 at its opposite end is connected at 132 to a side wall of the chassis frame. It is under tension to normally move the shaft 126 so that the detents 125 will be thrown into engagement with inwardly extending flange portions 140 of the side arms 120 and 121 of the handle structure. The detents thus will hold the handle in the position shown. It should be noted that the side walls of the vehicle are provided with angle clips 142 which engage the flanges 140 to limit the down position of the handle to that shown in Figures 1 and 2. Since both detents 125 operate upon the same shaft, all that is necessary, in order to release the handle, is to swing one of the detents up and the handle can be swung forwardly. In its most forward position, shown in Figure 6, the handle structure 123 has the bar arms 120 and 121 horizontally positioned and the hand engaging bar 124 lies upon and across the front wall structure in the platform shown in Figure 7.

With the handle in the position shown in Figure 6, the floor structure or platform 100 is collapsed into the chamber of the vehicle to the rear of the seat. In this position the wheels can perform their proper spring function, and the child is free to straddle the seat and use the vehicle as a baby walker.

One of the most important features of the invention is the linkage which supports the floor or foot rest platform. It is arranged to swing the platform structure almost vertically during the initial movement when converting the vehicle from a baby walker to a carriage, to the dotted position shown in Figure 7. The friction bar 103 engages the ground or floor surface as shown in dotted lines in Figure 7, considerably to the rear of the feet of the child resting in the vehicle, and upon swinging the handle structure 123 upwardly during such conversion the linkage will move the seat so as to elevate the rear running gear above the ground or floor surface and move the vehicle rearwardly. This will lift and seat the child so that its feet will be lifted off the floor surface, and thereafter upon continued upward and to the rear movement of the handle structure, the foot rest or platform 100 will be swung to an almost horizontal position beneath the feed of the child, and upon continued movement the platform will be elevated beneath the feet of the child to the horizontal position shown in Figure 1, without any liability of injury to the child's feet or legs.

When converting from carriage use to baby walker use, the detents 125 are released and the handle swung forwardly. The platform or foot rest will be lowered and swung to the rear, and the car lifted at the rear running gear and moved forwardly to gently move the child into the seat.

Package carrying means G includes a wire rack 150 pivoted at 151 upon the rear wall of the chassis frame structure so that it may be swung from a collapsed position to the dotted line position shown in Figure 6. Suitable wire guard and supporting rods 153 are connected at each side of the rack; the same operating through suitable openings in the rear wall structure of the chassis frame. These rods may be collapsed into the compartment of the chassis frame body, as shown in such collapsed positioning in Figure 1.

Figure 7:
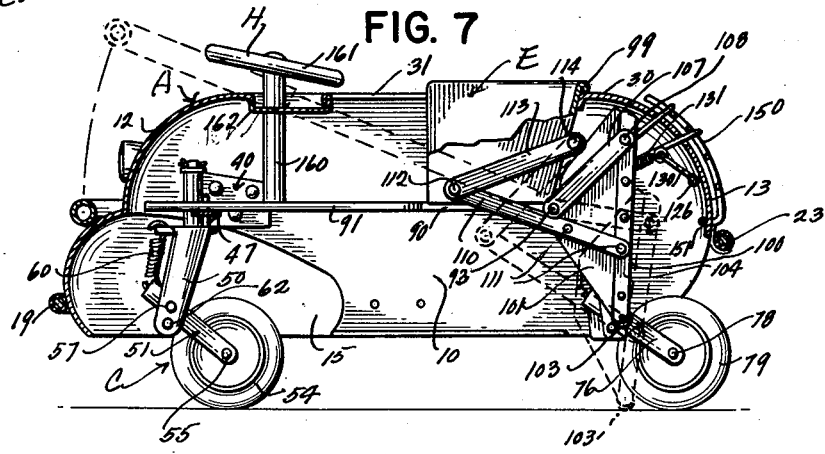
Figure 7 is a longitudinal cross sectional view taken through the vehicle with the parts positioned to serve as a baby walker, but showing in dotted lines the initial movement of an operating mechanism lowering the foot rest preliminary to conversion from a baby walker to a carriage.

If desired, the vehicle can be provided with a dummy steering gear H including a post 160, mounted as shown in Figure 7, having a rotatable wheel 161 at the top thereof. Also a suitable toy carrying tray 162 may be provided upon the top wall structure at the front of the child receiving compartment, as shown in Figure 7.

Various changes in the shape, size and arrangement of parts may be made to the form of invention herein shown and described, without departing from the spirit of the invention or the scope of the claims.

I claim:

1. In a child's vehicle the combination of a chassis frame structure including running gear, a foot rest platform, means pivotally connecting the foot rest platform upon the chassis frame so that it may be collapsed upon the frame structure for use of the vehicle as a baby walker or moved thereby to a position for supporting the feet of a child, and handle means for effecting movement of the platform to collapsed and extended positions and connected with the last mentioned means in such relation as to be collapsed upon the frame structure when the foot rest platform is collapsed and moved in position to be used as a push handle for the vehicle when the foot rest platform is moved in position for support of a child's feet.

2. In a convertible baby walker and carriage the combination of a chassis frame including running gear and a child's seat, the latter being so arranged that a child may sit thereon and touch the floor or ground surface upon which the running gear is positioned, a handle pivotally mounted upon the chassis frame and swingable to a collapsed position forwardly upon the vehicle or to an elevated angular position for use as a handle in pushing the vehicle as a carriage, a foot rest, and linkage connecting the foot rest with the handle and movable with the handle to serve as a foot rest in association with the seat when the handle is extended for carriage pushing purposes, and movable to a collapsed position when the handle is collapsed forwardly upon the vehicle.

3. A convertible baby walker and carriage comprising a chassis frame including running gear and a child's seat, the same being so associated with the chassis frame that a child may sit thereon with its feet touching the ground surface or floor surface to serve as a baby walker, a foot rest, means movably mounting the foot rest upon the frame so that it may be collapsed inoperatively upon the frame or moved therefrom downwardly and forwardly to a position beneath the feet of a child upon said seat, and a handle construction movably mounted upon the chassis frame connected with the last mentioned means for operating the last mentioned means to move said foot rest to collapsed or operatively extended positions.

4. A child's vehicle including a chassis frame and a seat, a foot rest, pivoted compound linkage mounted upon said chassis frame and connected with said foot rest for moving the foot rest to a collapsed position within the chassis frame with respect to said seat and therefrom movable to an extended position to serve as a foot rest in association with an individual seated upon said seat, and handle means movably mounted upon said chassis frame and connected with said linkage for so moving said foot rest.

5. A convertible baby walker and carrriage comprising a chassis frame having a seat thereon for supporting a child in such relation that a child's feet may engage the ground or floor surface upon which the vehicle rests, a foot rest, compound linkage movably connecting said foot rest upon the chassis frame so that the foot rest may be collapsed upon the frame and moved from collapsed position downwardly to engage a floor or ground surface rearwardly of the seat and in such relation that the foot rest upon continued movement to an operative position will raise the rear of the frame and seat to elevate the child's feet and therefrom move forwardly to a supporting position beneath the feet of the child.

6. A convertible baby walker and carriage comprising a chassis frame having a seat thereon for supporting a child in such relation that the child's feet may engage the ground or floor surface upon which the vehicle rests, a foot rest, compound linkage movably connecting said foot rest upon the chassis frame so that the foot rest may be collapsed upon the frame and moved from such collapsed position downwardly to engage a floor or ground surface rearwardly of the seat and in such relation that the foot rest upon continued movement to an operative position will raise the rear of the frame and seat to elevate the child's feet and therefrom move forwardly to a supporting position beneath the feet of the child, and means for so moving said linkage foot rest including a carriage pushing handle normally collapsed forwardly upon the frame when the foot rest is collapsed inoperatively upon the chassis frame and disposed in extended carriage pushing relation when the foot rest is positioned in supporting position.

7. A child's vehicle comprising a chassis frame having a seat thereon, resiliently mounted running gear for the vehicle including resiliently mounted rear wheels and a resiliently mounted caster wheel construction forwardly thereof, a foot rest, means movably connecting the foot rest upon the frame so that the same may be swung from a collapsed position upon the frame to a foot rest position with respect to said seat and vice versa, and handle means associated with the last mentioned means for moving said foot rest, said handle being collapsed upon the chassis frame to a shape conforming position with the frame when the foot rest is collapsed inoperatively upon the frame, and adapted to serve as a push handle for the frame as a carriage when the foot rest is in position for supporting the feet of a child thereon.

8. A convertible baby walker and carriage comprising a chassis frame having a child's seat therein, a foot rest, means mounting the foot rest upon said chassis frame for movement to a position for support of the feet of a child disposed upon said seat and movable therefrom to a collapsed inoperative position upon the frame when the vehicle is to serve as a baby walker, carriage handle means, means connecting the foot rest with the handle means for moving the foot rest into its various collapsed and operative positions, and releasable detent means to hold said handle in position to serve as a carriage pushing handle.

9. A convertible baby walker and carriage comprising a chassis frame having a seat thereon for supporting a child in such relation that the child's feet can engage the ground or floor surface upon which the vehicle rests, a foot rest, linkage movably connecting said foot rest upon the chassis frame so that the foot rest may be collapsed upon the frame and moved from the collapsed position downwardly and forwardly to engage beneath the child's feet sitting in the vehicle for the purpose of raising the child's feet, and handle means for effecting movement of the foot rest to collapsed and extended positions.

DAVID J. WEIRICH.

References Cited in the file of this patent

UNITED STATES PATENTS

| Number | Name | Date |
|---|---|---|
| 2,341,117 | Reinholz | Feb. 8, 1944 |
| 2,427,964 | Hansburg | Sept. 23, 1947 |
| 2,534,539 | Topper | Dec. 19, 1950 |